(12) United States Patent
Hagemann et al.

(10) Patent No.: US 7,357,250 B2
(45) Date of Patent: Apr. 15, 2008

(54) STORAGE CASE

(75) Inventors: John J. Hagemann, Plano, IL (US);
John Whalen, Sheridan, IL (US);
Joseph F. Fiore, Lebanon, PA (US);
Thomas Hurt, Elgin, IL (US)

(73) Assignee: Plano Molding Company, Plano, IL (US)

( * ) Notice: Subject to any disclaimer, the term of this patent is extended or adjusted under 35 U.S.C. 154(b) by 393 days.

(21) Appl. No.: 10/992,493

(22) Filed: Nov. 16, 2004

(65) Prior Publication Data
US 2006/0101706 A1    May 18, 2006

(51) Int. Cl.
*B65D 85/00*    (2006.01)
*A01K 97/06*    (2006.01)

(52) U.S. Cl. .............. 206/315.11; 206/747; 206/759; 206/762; 43/54.1

(58) Field of Classification Search .......... 206/315.11, 206/740, 743, 744, 745, 747, 748, 749, 759, 206/762; 43/54.1, 57.1
See application file for complete search history.

(56) References Cited
U.S. PATENT DOCUMENTS

| | | | |
|---|---|---|---|
| 2,125,856 A | 8/1938 | DeWitt | |
| 2,427,218 A * | 9/1947 | Liebson | 312/73 |
| 3,074,539 A * | 1/1963 | Rogovin | 206/379 |
| 3,437,389 A | 4/1969 | Perkins et al. | |
| 3,493,102 A * | 2/1970 | Belokin, Jr. | 312/215 |
| 3,606,005 A | 9/1971 | Meksula | |
| 4,006,821 A | 2/1977 | Sautter | |
| 4,474,291 A | 10/1984 | Fortson | |
| 4,846,346 A | 7/1989 | Kime | |
| 4,927,016 A | 5/1990 | Fuller | |
| 5,172,810 A * | 12/1992 | Brewer | 206/369 |
| 5,606,820 A * | 3/1997 | Suddeth | 43/57.1 |
| 5,711,428 A * | 1/1998 | Ho | 206/738 |
| 6,256,925 B1 | 7/2001 | Blackburn | |
| 6,883,671 B2 * | 4/2005 | Rushing | 211/88.01 |

* cited by examiner

*Primary Examiner*—David T. Fidei
(74) *Attorney, Agent, or Firm*—Vedder Price, P.C.

(57) ABSTRACT

A storage case including a tray and a plurality of holding units. The tray has a bottom wall and a plurality of walls formed unitarily with and upstanding from the bottom wall. The holding units include a base and a plurality of walls formed unitarily therewith to cooperatively define at least one receptacle. Means for connecting the tray and holding units is provided whereby the holding units are moveable between first and second orientations relative to the tray.

18 Claims, 4 Drawing Sheets ized, have limbs that may tangle or any other non-
STORAGE CASE

BACKGROUND

This disclosure relates generally to the storage of objects have a non-standard shape. For example, the objects may be oversized, have limbs that may tangle or any other non-standard characteristic. One example of a non-standard shaped object, which will be used throughout this disclosure, is a particular variety of artificial fish baits (i.e., lures) that have a relatively large, generally planar element depending from the lure. The depending element is generally called a blade or a spoon, and the lures are commonly referred to as spinner bait, because of the spinning action of the spoon-shaped blade when the lure is pulled through the water by a fisherman. More specifically, the disclosure is directed to separation of the non-standard objects from one another when they are stored, so that a given object can be selectively retrieved without risk that the selected object will be tangled with the other objects or without removing other objects to obtain access to the desired object.

Throughout this disclosure the spinner bait will be used as an exemplar of a non-standard object. It is within the teachings of this disclosure that any other suitable non-standard or standard dimensioned object may be substituted therefor. Those of ordinary skill in the art will also recognize that this disclosure shall not be limited to the exemplar of the spinner bait as disclosed. Rather, the spinner bait exemplar is useful to facilitate description of the storage case disclosed herein.

Generally, a spinner bait consists primarily of a piece of narrow wire that is bent at a point near its middle to define a generally V-shaped member. A distal end of a fishing line is usually connected to the apex of the V, so that the lure can be pulled through the water by a fisherman to simulate the movement of a minnow or a small fish that might be attractive to a large fish. At the distal end of one of the legs of the V, is a body, including a head and a downwardly extending hook generally concealed by a plurality of narrow and flexible strips that, in total, generally define a depending skirt around the hook. At the end of the other leg is a blade, usually having a slightly concave shape and often called a spoon because of the similarity in appearance to the shallow bowl of a teaspoon. The blade often has a generally elliptical shape and it is often brightly painted or made of shiny metal.

A swivel connector is used to connect the forward end of the spoon to the second leg, so that the spoon will swivel or spin as the lure is pulled through the water. The spinning characteristic of a moving spoon is the basis for the name given to such lures, namely, spinner bait.

The wide angle between the two wire legs of a spinner bait, usually causes the lures to be somewhat awkward to handle when they are being put into and taken from a storage place. If several loose spinner bait are hastily thrown into a pile in the bottom of an ordinary tackle box, they frequently become entangled with one another, such that it is often hard to pull one of them from a pile without also lifting one or two of the other ones at the same time.

One conventional system for storing spinner bait uses transparent packets or envelopes which can be fit into designated slots formed in the sidewalls of a box.

Another conventional storage device for spinner bait includes a plurality of individual receptacles joined together to form an array which are disposed in a container. The receptacles are configured to receive one leg of the spinner bait to which the blade is connected. The other leg of the spinner bait to which the hook is attached is disposed outside the receptacle. A hook plate extends from the receptacle wall to provide means for locking the spinner bait in position. However, the receptacles are configured to stand upright within the container, thereby occupying a considerable amount of space relative to the actual size of the spinner bait and accordingly requiring a large enclosure to house such array.

Therefore, there exists a need in the art for a compact, high density storage solution for non-standard objects which has receptacles for individual objects to be easily inserted for storage and accessed for removal and usage, yet is compact, lightweight and inexpensive.

BRIEF DESCRIPTION OF THE DRAWINGS

Certain embodiments are shown in the drawings. However, it is understood that the present disclosure is not limited to the arrangements and instrumentality shown in the attached drawings, wherein.

DETAILED DESCRIPTION OF THE PREFERRED EMBODIMENTS

Figure 1:
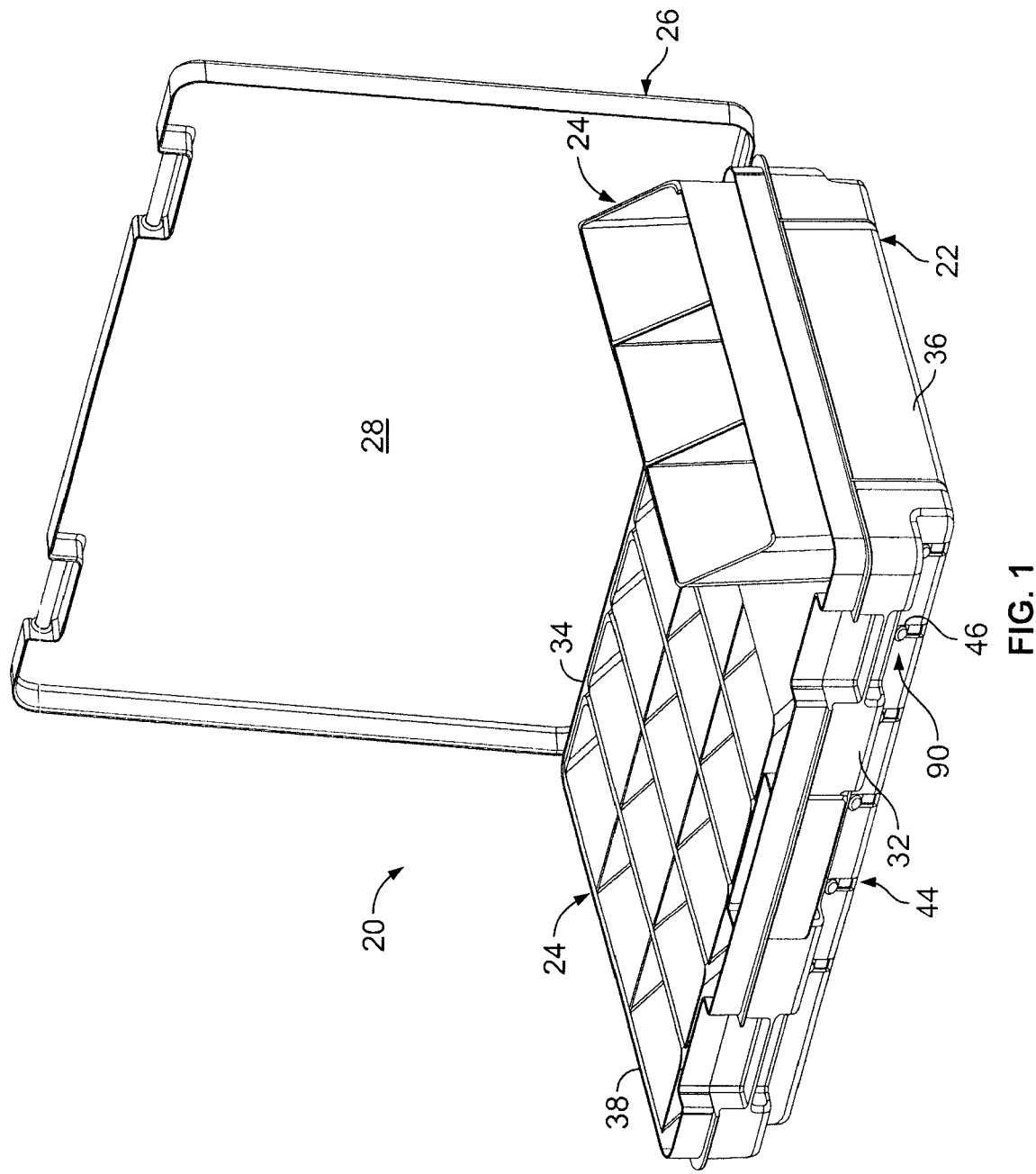
FIG. 1 is a perspective view of a storage case.

For the purposes of promoting and understanding the principles disclosed herein, reference will now be made to the preferred embodiments illustrated in the drawings and specific language will be used to describe the same. It will nevertheless be understood that no limitation of the scope is thereby intended. Such alterations and further modifications in the illustrated device and such further applications are the principles disclosed as illustrated therein as being contemplated as would normally occur to one skilled in the art to which this disclosure relates.

In one embodiment, a storage case includes a tray and a plurality of holding units. The tray includes a bottom wall and a plurality of walls formed unitarily with and upstanding from the bottom wall. The holding units each include a base and a plurality of walls formed unitarily therewith to cooperatively define at least one receptacle. Means are provided for connecting the tray and holding units whereby the holding units are moveable between first and second orientations relative to the tray.

In another embodiment, a holding unit for use in connection with a storage case includes a base and a plurality of compartment walls formed unitarily with and extending from the base. The compartment walls include a back wall, a front wall, a pair of end walls and at least one divider wall extending between the back wall and the front wall. The compartment walls cooperatively define a plurality of receptacles each having an opening defined in a plane oriented oblique to the back and front walls. A pair of lugs are disposed on longitudinally opposed ends of the base of each spinner base holding unit for engaging the case such that the holding unit is moveable from a first orientation to a second orientation.

In yet another embodiment, a tray for use in connection with a storage case including a plurality of holding units includes a bottom wall and a plurality of walls formed unitarily with and upstanding from the bottom wall. The walls include a front wall, rear wall and a pair of end walls. Each of the walls has a free end. The front and rear walls each include a mounting shoulder. The front wall mounting shoulder is formed contiguous with the front and bottom wall. The rear wall mounting shoulder is formed contiguous with the rear and bottom wall. The front wall and rear wall mounting shoulders include a plurality of aligned pairs of bosses formed therein.

With reference to the drawings, one embodiment of the storage case is shown for purposes of illustrative disclosure in FIG. 1. The storage case 20 includes a tray 22, a plurality of holding units 24 and a cover 26 that is connected to the tray 22 by hinges of conventional design (not shown in detail). Latches of conventional design may also be provided to secure the cover 26 to the tray 22 in a closed position. However, such latches have been removed for clarity.

Figure 4:
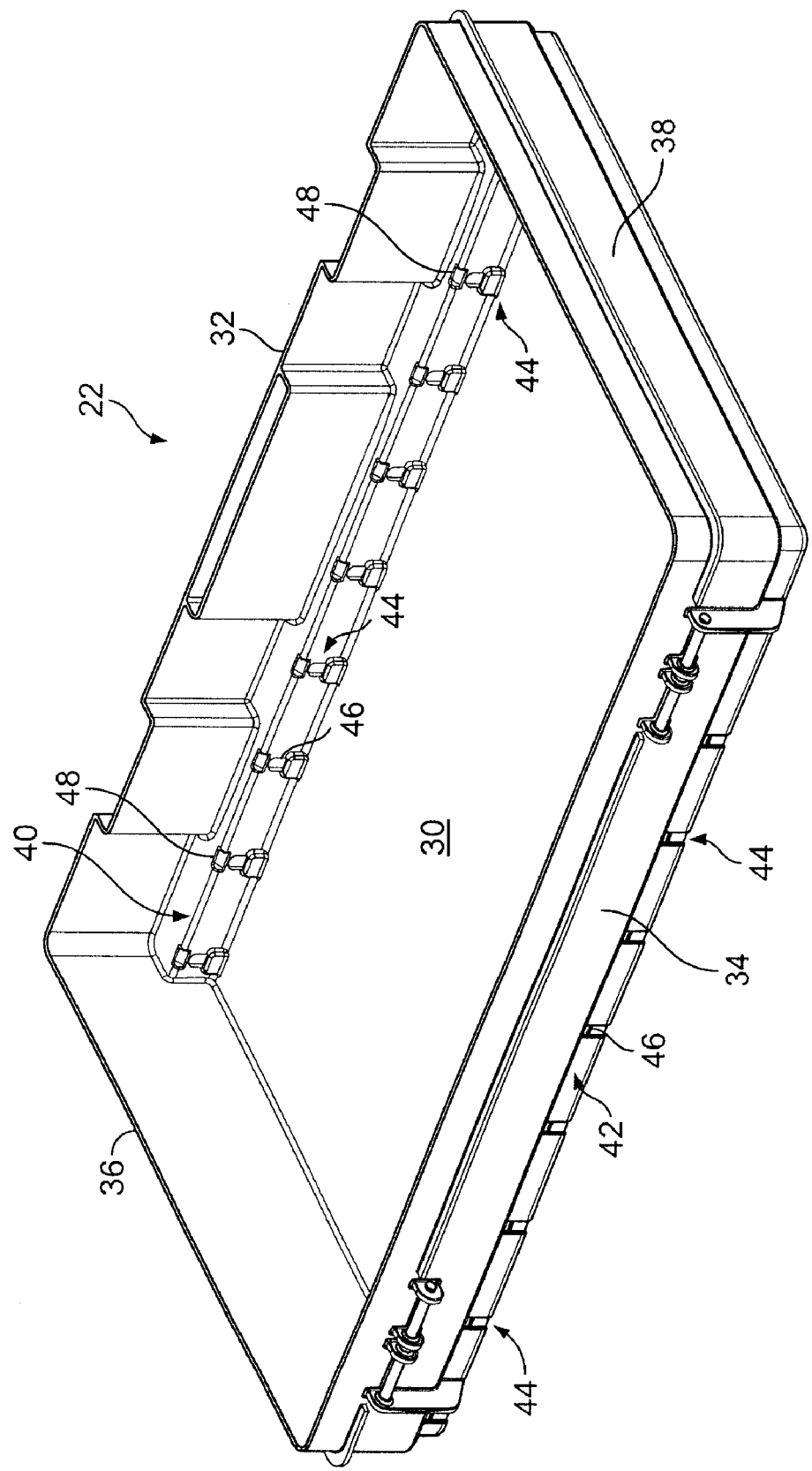
FIG. 4 is a tray for use in connection with the storage case of FIG. 1.

The tray 22, as best seen in FIG. 4, includes a bottom wall 30. Formed unitarily with and upstanding from the bottom wall 30 are a plurality of walls including a front wall 32, a rear wall 34, opposed side walls 36 and 38.

The front and rear walls 32 and 34 each include a mounting shoulder 40 and 42, respectively. The front wall mounting shoulder 40 is formed contiguous with the front wall 32 and the bottom wall 30. The rear wall mounting shoulder 42 is formed contiguous with the rear wall 34 and the bottom wall 30. The mounting shoulders 40 and 42 cooperatively include a plurality of aligned pairs of bosses 44 formed therein. Each mounting boss 44 includes an aperture 46 configured to engage a portion of the holding units as discussed below. Each mounting boss 44 further includes a lead-in ramp 48 disposed adjacent each aperture 46 to facilitate engagement with the holding units. As best shown in FIG. 1, the cover 26 has a lower surface 28 facing the tray 22 when disposed in covering relation to the tray 22.

Figure 2:
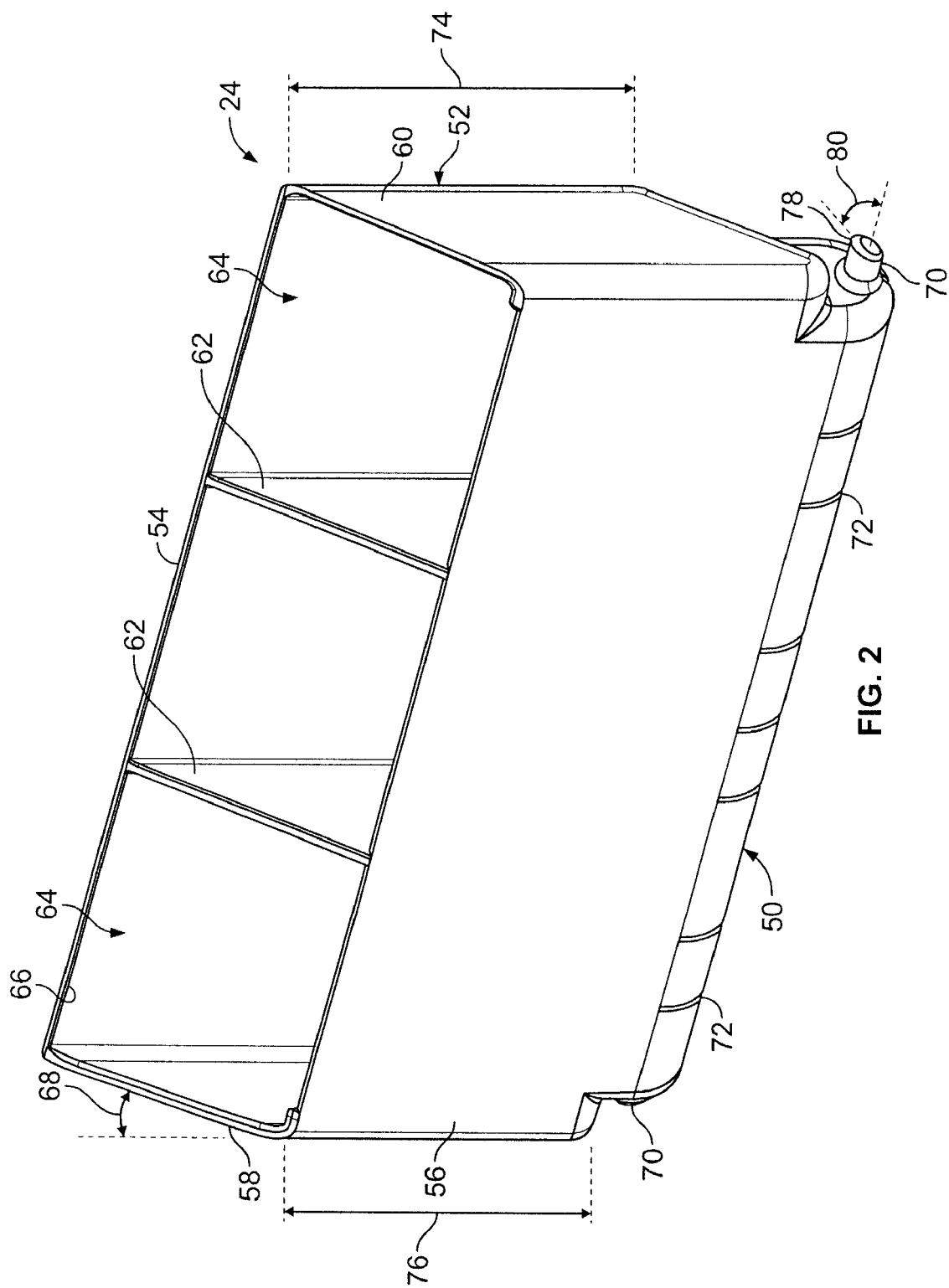
FIG. 2 is a perspective view of a holding unit.

Referring now to FIG. 2, the holding unit 24 used in connection with the storage case includes a base 50 and a plurality of compartment walls 52 formed unitarily with and extending from the base 50. The compartment walls 52 include a back wall 54, a front wall 56, a pair of end walls 58 and 60 and at least one divider wall 62 extending between the back wall 54 and the front wall 56. The compartment walls 52 and divider wall(s) 62 cooperatively define a plurality of receptacles 64 each having an opening 66 defined in a plane oriented oblique, as shown by reference arrow 68, to the back and front walls 54 and 56, respectively. A pair of lugs 70 are disposed on longitudinally opposed ends of the base 50 for engaging the mounting boss of the storage case, as discussed above, such that the holding unit 24 is moveable from a first orientation, shown by the three leftmost holding units 24 in FIG. 3, to a second orientation, shown by the three rightmost holding units 24 in FIG. 3. A plurality of slots 72 are formed in the base 50 to facilitate water drainage from the receptacles 64.

Preferably, each at least one divider wall 62 is parallel to the pair of end walls 58 and 60. However, it will be recognized by those of skill in the art that this embodiment shall not be so limiting to this disclosure in that the divider walls 62 may also be disposed oblique to the back wall 54 and front wall 56. The back wall 54 preferably has a greater extent as shown by reference arrow 74, from the base than the extent, as shown by reference arrow 76, of the front wall from the base 50. The lugs 70 each have a free end 78 configured oblique to a longitudinal axis of the lugs 70 as shown by reference arrow 80. It will be recognized by those of skill in the art that the oblique face on the free end facilitates installation of the holding units 24 to the tray 22 when the holding units 24 are disposed in a vertical upright orientation.

Figure 3:
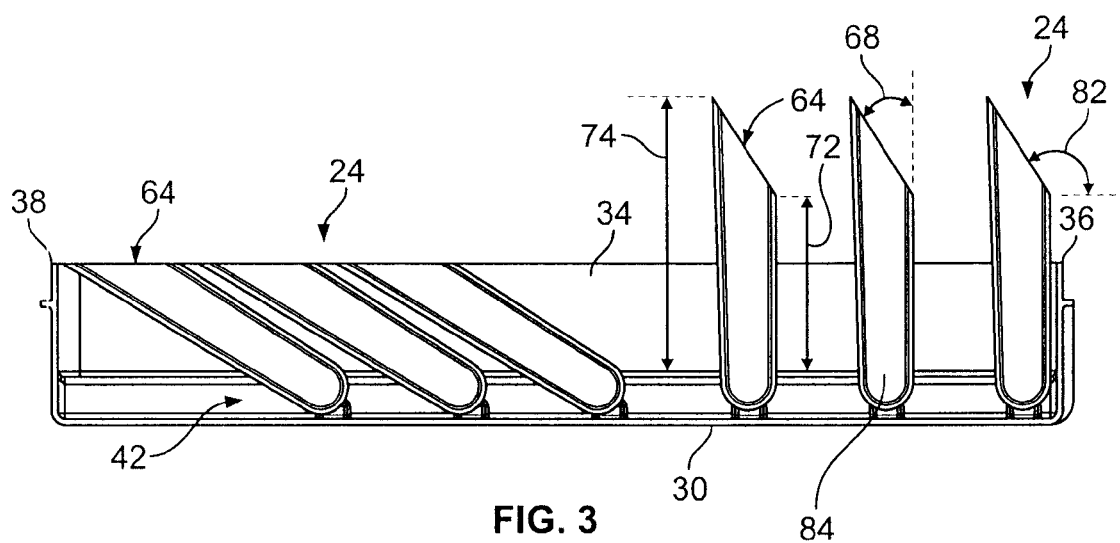
FIG. 3 is a cross-sectional view of the storage case of FIG. 1 with several of the holding units disposed in a first and several other holding units disposed in a second orientation, wherein a cover removed for clarity.

Referring now to FIG. 3, the holding units 24 disposed in the first orientation, as shown by the leftmost holding units 24, are configured in this orientation for storage and transportation. The holding units 24 disposed in the second orientation, shown in the rightmost holding units 24, are configured in this orientation for access to insert or remove the spinner bait. Each receptacle 64 includes an opening 66 defined in a plane disposed parallel to the bottom wall 30 when the holding units 24 are disposed in the first orientation and oblique to the bottom wall, as shown by reference arrow 82, when the holding units 24 are disposed in the second orientation. Each receptacle 64 defines a volume 84 configured substantially as a parallelepiped when viewed from the end walls 58 or 60. The rear wall mounting shoulder 42 is more clearly illustrated in this FIG. 3 as the means for connecting the tray 22 and holding units 24. In one embodiment, the mounting shoulders may be formed unitarily with the adjacent bottom wall 30 and front or rear walls.

Furthermore, while the particular preferred embodiments have been shown and described, it will be obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective based on the related art.

What is claimed is:

1. A storage case comprising: a tray and a plurality of holding units; the tray including a bottom wall and a plurality of walls formed unitarily with and upstanding from the bottom wall; said holding units including a base and a plurality of walls formed unitarily therewith to cooperatively define at least one receptacle; said receptacle having an opening offset from the base and defined in a plane parallel to the bottom wall; and means connecting the tray and the holding units whereby said holding units are moveable between first and second orientations relative to the tray, wherein the means connecting the tray and holding units further includes a pair of opposed mounting shoulders formed contiguous with the bottom wall and opposing walls of the tray and a pair of lugs disposed on opposed longitudinal ends of the base of the holding units for engaging one pair of bosses.

2. The case as recited in claim 1, wherein the holding units disposed in the first orientation are configured for storage and the holding units disposed in the second orientation are configured for access.

3. The case as recited in claim 1, wherein each at least one receptacle includes an opening defined in a plane disposed parallel to the bottom wall when the holding units are disposed in the first orientation and oblique to the bottom wall when the holding units are disposed in the second orientation.

4. The case as recited in claim 1, wherein the walls of said holding units further include a back wall, a front wall and a pair of end walls and at least one divider wail extending between the back wall and the front wall to cooperatively define a plurality of receptacles.

5. The case as recited in claim 4, wherein the back wall has a greater extent from the base than the front wall.

6. The case as recited in claim 1, wherein the walls of said holding units further include a back wall, a front wall and a pair of end walls and at least one divider wall extending between the back wall and the front wall to cooperatively define a plurality of receptacles and wherein each at least one divider wall has an upper edge that is parallel to the bottom wall in the first orientation and oblique to the bottom wall in the second orientation.

7. The case as recited in claim 4, wherein each at least one divider wall is parallel to the pair of end walls.

8. The case as recited in claim 1, wherein each at least one receptacle defines a volume configured substantially as a parallelepiped.

9. A holding unit for use in connection with a storage case, the holding unit comprising:
   a base and a plurality of compartment walls formed unitarily with and extending from the base;
   the compartment walls including a back wall, a front wall, a pair of end walls and at least one divider wall extending between the back wall and the front wall wherein the compartment walls cooperatively define a plurality of receptacles each having an opening defined in a plane oriented oblique to the back and front walls; and
   a pair of lugs disposed on longitudinally opposed ends of the base of each holding unit for engaging the storage case.

10. The holding unit as recited in claim 9, wherein each at least one divider wall is parallel to the pair of end walls.

11. The holding unit as recited in claim 9, wherein the back wall has a greater extent from the base than the front wall.

12. The holding unit as recited in claim 9, wherein the lugs each have a free end configured oblique to a longitudinal axis of the lugs.

13. The holding unit as recited in claim 9, wherein each receptacle defines a volume configured substantially as a parallelepiped.

14. A tray for use in connection with a storage case including a plurality of holding units, the tray comprising:
   a bottom wall and a plurality of walls formed unitarily with and upstanding from the bottom wall;
   the walls including a front wall, a rear wall and a pair of end walls, each of the walls having a free end;
   the front and rear walls each including a mounting shoulder;
   the front wall mounting shoulder formed contiguous with the front wall and the bottom wall;
   the rear wall mounting shoulder formed contiguous with the rear wall and the bottom wall; and
   the mounting shoulders including a plurality of aligned pairs of bosses formed therein.

15. The tray as recited in claim 14, wherein each mounting boss includes an aperture configured to engage one of the holding units.

16. The tray as recited in claim 15, further including a lead-in ramp disposed adjacent each aperture to facilitate engagement with the holding units.

17. The tray as recited in claim 14, further including a cover having a lower surface facing the tray when disposed in covering relation to the tray.

18. The case as recited in claim 1 further including a cover having a lower surface facing the tray when disposed in covering relation to the tray.

* * * * *